US012313245B1

(12) United States Patent
Jiang

(10) Patent No.: US 12,313,245 B1
(45) Date of Patent: May 27, 2025

(54) MULTI-PURPOSE LIGHTING DEVICE

(71) Applicant: Shunyuan Jiang, Dazhou (CN)

(72) Inventor: Shunyuan Jiang, Dazhou (CN)

(*) Notice: Subject to any disclaimer, the term of this patent is extended or adjusted under 35 U.S.C. 154(b) by 0 days.

(21) Appl. No.: 18/972,061

(22) Filed: Dec. 6, 2024

(30) Foreign Application Priority Data

Oct. 25, 2024 (CN) ........................ 202411502196.4

(51) Int. Cl.

| | |
|---|---|
| ***F21V 21/02*** | (2006.01) |
| ***F21S 8/06*** | (2006.01) |
| ***F21S 9/02*** | (2006.01) |
| ***F21V 1/14*** | (2006.01) |
| ***F21V 17/10*** | (2006.01) |
| ***F21V 17/16*** | (2006.01) |
| ***F21V 19/00*** | (2006.01) |
| ***F21V 23/06*** | (2006.01) |

(52) U.S. Cl.
CPC .............. *F21V 21/02* (2013.01); *F21S 8/065* (2013.01); *F21S 9/02* (2013.01); *F21V 1/143* (2013.01); *F21V 17/105* (2013.01); *F21V 17/16* (2013.01); *F21V 19/003* (2013.01); *F21V 23/06* (2013.01)

(58) Field of Classification Search
CPC ........ F21V 21/02; F21V 1/143; F21V 17/105; F21V 17/16; F21V 19/003; F21V 23/06; F21S 9/02; F21S 8/033–8/068
USPC .......................................................... 362/382
See application file for complete search history.

(56) References Cited

U.S. PATENT DOCUMENTS

| | | | | |
|---|---|---|---|---|
| 8,845,166 | B2 * | 9/2014 | Lederer | F21V 17/002 362/569 |
| 9,677,726 | B1 * | 6/2017 | DeLuca | F21V 23/04 |
| 10,871,277 | B2 * | 12/2020 | Kallus | F21S 9/02 |
| 2024/0360994 | A1 * | 10/2024 | Burghard | F21V 1/16 |

FOREIGN PATENT DOCUMENTS

| | | | |
|---|---|---|---|
| EP | 1686312 A1 * | 8/2006 | F21S 6/002 |

* cited by examiner

*Primary Examiner* — Laura K Tso
(74) *Attorney, Agent, or Firm* — JEEN IP LAW, LLC

(57) ABSTRACT

A multi-purpose lighting device is provided, which includes a bracket, a lampshade provided on the bracket, a lamp cover provided on a top of the bracket, and a lamp holder provided at a bottom of the bracket. A light emitting part and a power module are provided on the bracket and located in the lampshade. A bottom of the lamp holder is provided with a clamp slot with a downward opening; the lighting device can be placed on a horizontal surface for lighting use or hung on a support part of several types of lamp brackets through the clamp slot for lighting use. The support part includes a connection part that protrudes upward and is inserted into the clamp slot, the lighting device itself can be used as a type of light, or hung on different lamp brackets for use as a lighting fixture for different purposes.

10 Claims, 7 Drawing Sheets

MULTI-PURPOSE LIGHTING DEVICE

CROSS-REFERENCE TO RELATED APPLICATIONS

This application claims priority to Chinese Patent Application No. 202411502196.4, filed on Oct. 25, 2024, which is hereby incorporated by reference in its entirety.

TECHNICAL FIELD

The present disclosure relates to the field of lighting device technologies, and in particular, to a multi-purpose lighting device.

BACKGROUND

Lighting fixtures are indispensable daily necessities. With the advancement of technology, the appearance and shape of the lighting fixtures have also been constantly developing. According to the functions, the lighting fixtures can be classified into chandeliers, spotlights, wall lights, flashlights, table lights, floor lights, etc.

Although the existing lighting structures are constantly emerging, their usage methods are relatively single, and they cannot be used as lighting fixtures that can achieve multiple functions on one lighting fixture, thus, it is difficult to meet people's personalized needs.

SUMMARY

In view of this, the present disclosure provides a lighting device with multiple purposes, simple structure, and wide applicability.

The technical solution adopted by the present disclosure is as follows.

A multifunctional lighting device including a bracket, a lampshade provided on the bracket, a lamp cover provided on a top of the bracket, and a lamp holder provided at a bottom of the bracket; where a light emitting part and a power module connected to the light emitting part are provided on the bracket and located in the lampshade, a clamp slot with a downward opening is provided at a bottom of the lamp holder; the lighting device is capable of being placed on a horizontal surface for lighting use, or hung on a support part of several types of lamp brackets through the clamp slot for lighting use; the support part includes a connection part that is protruded upwardly and is capable of being inserted into the clamp slot.

In some embodiments of the present disclosure, the support part is a table light support rod, and the connection part is an upward end of the table light support rod, so that the lighting device serves as a table light.

In some embodiments of the present disclosure, the support part is a floor light rod, and the connection part is an upward end of the floor light rod, so that the lighting device serves as a floor light.

In some embodiments of the present disclosure, the support part is a wall light suspension bracket, and the connection part is an upward end of the wall light suspension bracket, so that the lighting device serves as a wall light.

In some embodiments of the present disclosure, the support part is a pendant light hanger, and the connection part is an upward end of the pendant light hanger, so that the lighting device serves as a pendant light.

In some embodiments of the present disclosure, the bracket includes an upper support frame, a lower support frame, and a connection rod connecting the upper support frame and the lower support frame; the light emitting part is provided on the upper support frame, the lamp holder is provided on the lower support frame, and the lampshade is detachably connected to both the upper support frame and the lower support frame.

In some embodiments of the present disclosure, the lamp holder includes a base fixing member provided above the lower support frame, and a bottom plate provided below the lower support frame; where the base fixing member and the bottom plate are fixed in a detachable connection manner; and the clamp slot is provided on the base fixing member.

In some embodiments of the present disclosure, a top of the lampshade is provided with a first elastic buckle that is fastened to an outside of the upper support frame, a support ring is provided below the bottom plate, and a bottom of the lampshade is provided with a second elastic buckle that is fastened to an outside of the support ring.

In some embodiments of the present disclosure, the power module includes a battery housing provided on the base fixing member, a battery provided on the base fixing member and located in the battery housing, and a USB charging port that charges the battery; the lamp cover is covered on the battery housing.

In some embodiments of the present disclosure, an upper end of the base fixing member is sleeved with a magnetic ring, and a end of the connection part has magnetism.

In some embodiments of the present disclosure, the light emitting part includes a light strip provided on the upper support frame, and a plurality of light beads provided on the light strip.

The beneficial effect of the present disclosure is that the lighting device includes a bracket, a lampshade, a lamp cover, and a lamp holder. The bracket is provided with a light emitting part and a power module; a clamp slot with an downward opening is provided at a bottom of the lamp holder. When in use, the lighting device can be placed on a horizontal surface for lighting or hung on a support part of several types of lamp brackets through the clamp slot for lighting. That is to say, the lighting device itself can be used as a light or hung on different lamp brackets for use as a lighting fixture for different purposes such as a table light, a floor light, a wall light, and a pendant light. At the same time, it only needs to be hung on the support part through the clamp slot on it, with a simple structure and convenient operation.

DESCRIPTION OF EMBODIMENTS

Below, the technical solutions in the embodiments of the present disclosure will be clearly and completely described in combination with the accompanying drawings.

Figure 1:
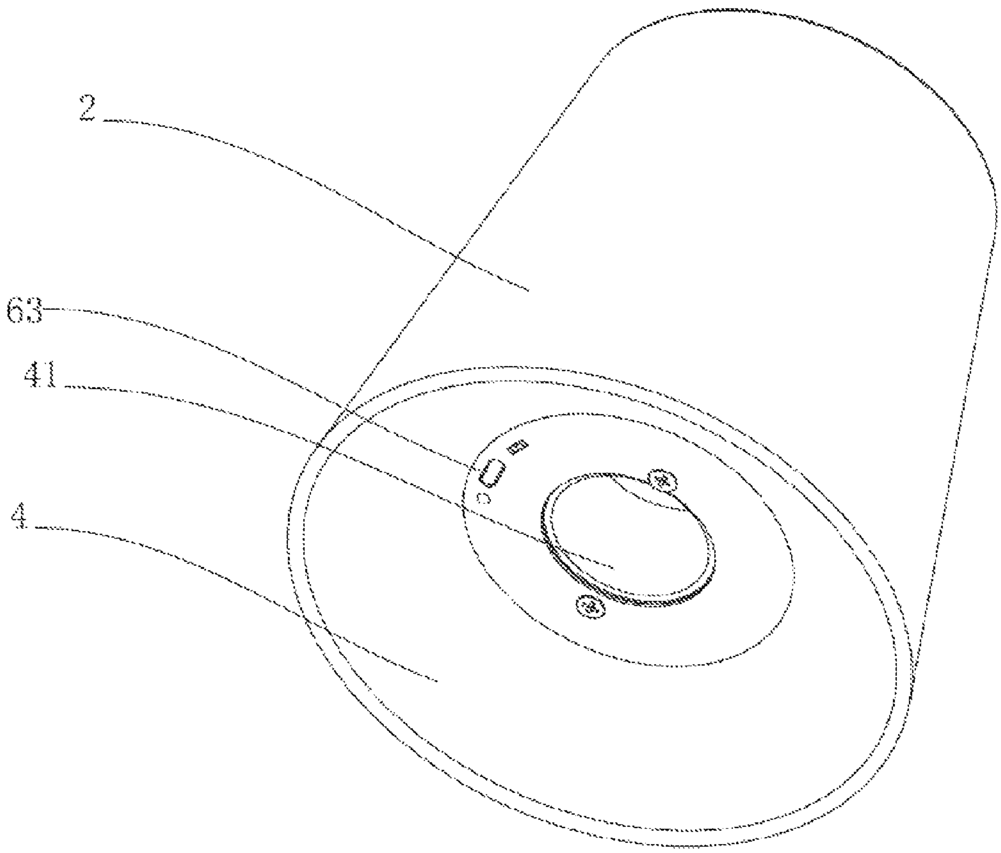
FIG. 1 is a schematic diagram of a multi-purpose lighting device according to the present disclosure.
Figure 2:
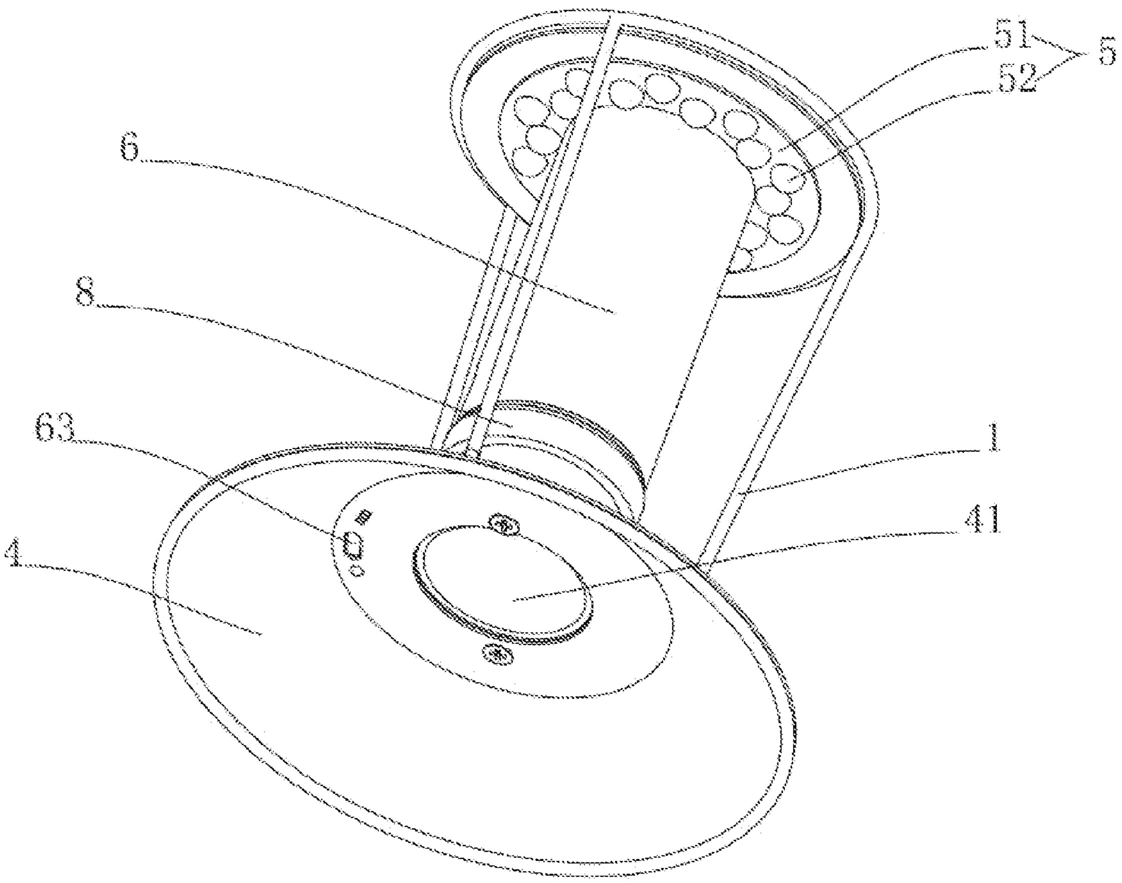
FIG. 2 is an internal schematic diagram of the multi-purpose lighting device according to the present disclosure.
Figure 3:
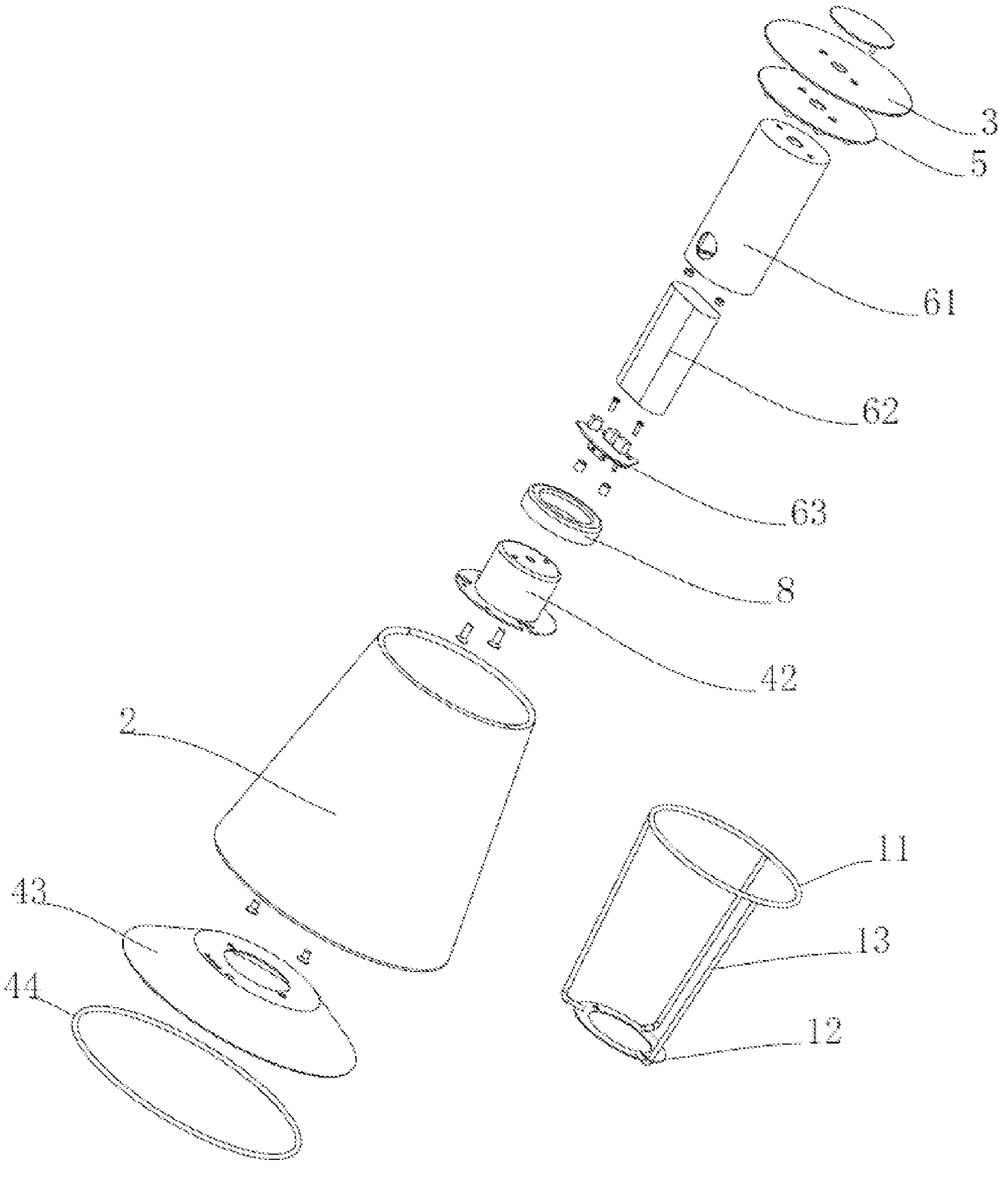
FIG. 3 is an exploded view of the multi-purpose lighting device according to the present disclosure.
Figure 4:
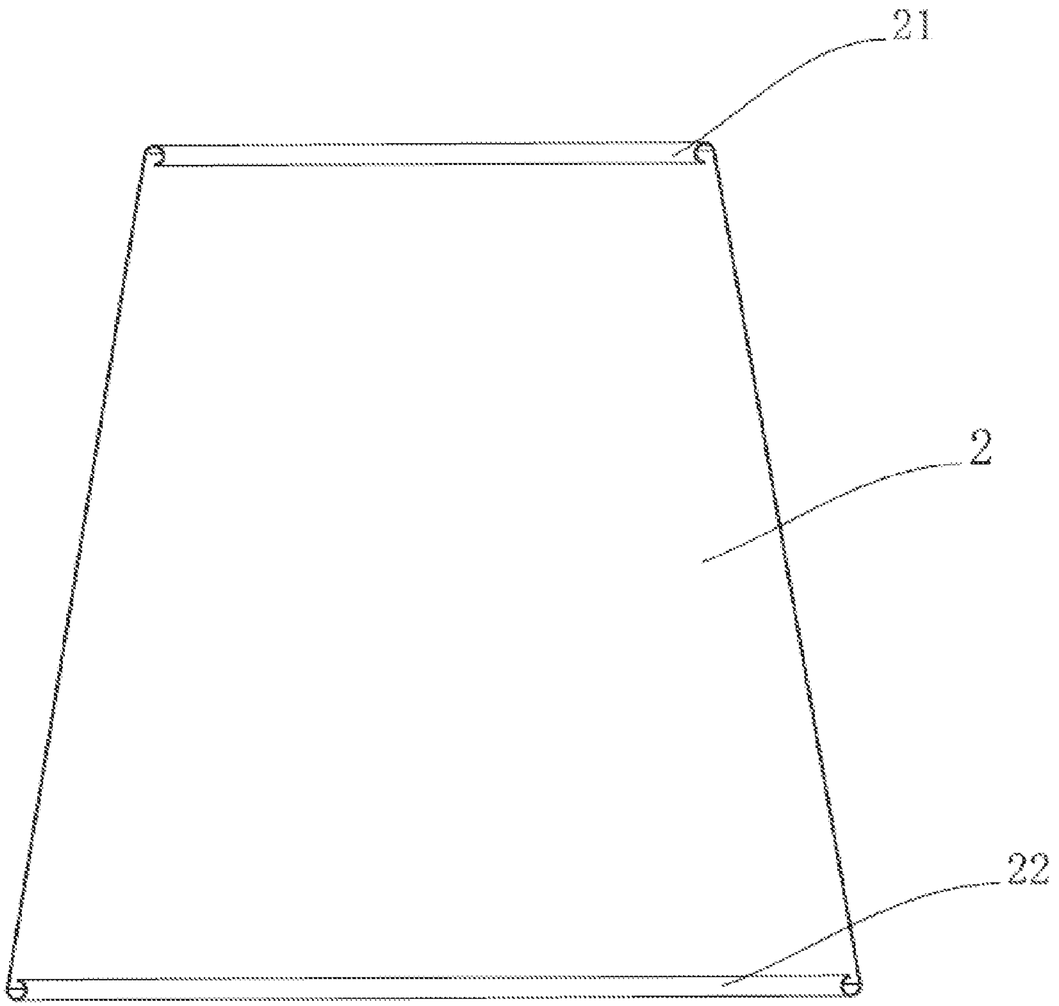
FIG. 4 is a sectional view of a lampshade in the multi-purpose lighting device of the present disclosure.
Figure 5:
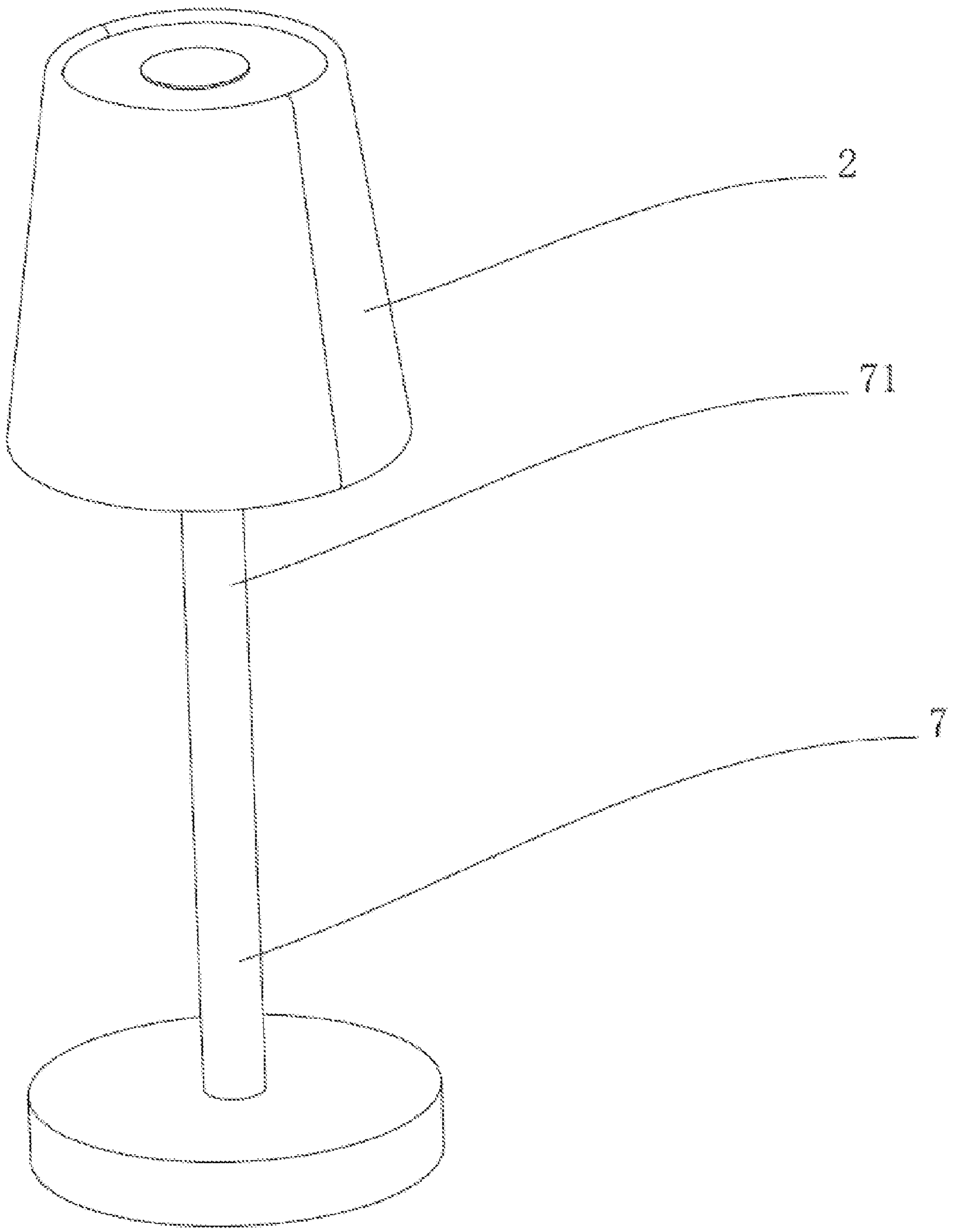
FIG. 5 is a schematic diagram of the multi-purpose lighting device as a table light in the present disclosure.
Figure 6:
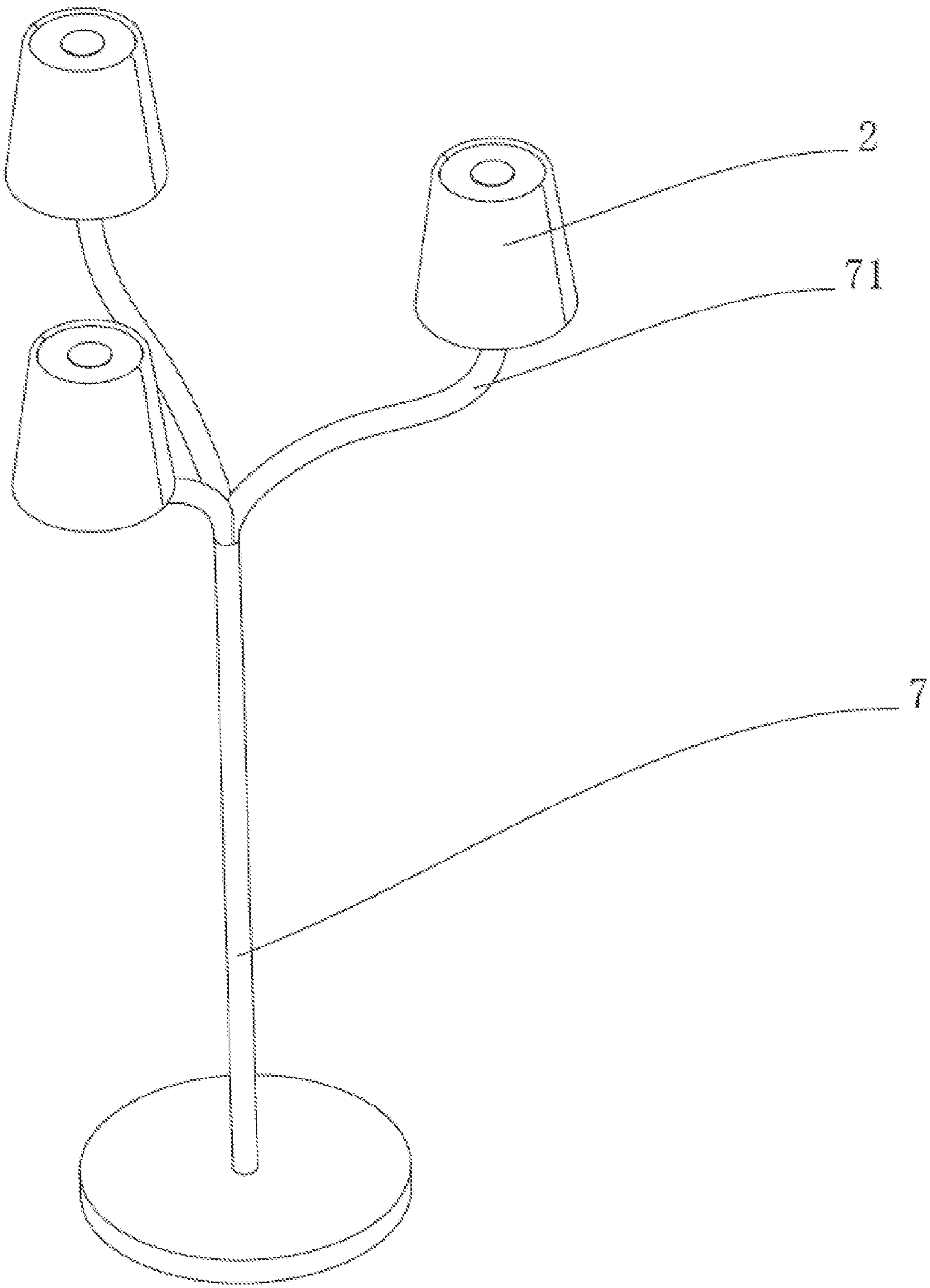
FIG. 6 is a schematic diagram of the multi-purpose lighting device as a floor light according to the present disclosure.
Figure 7:
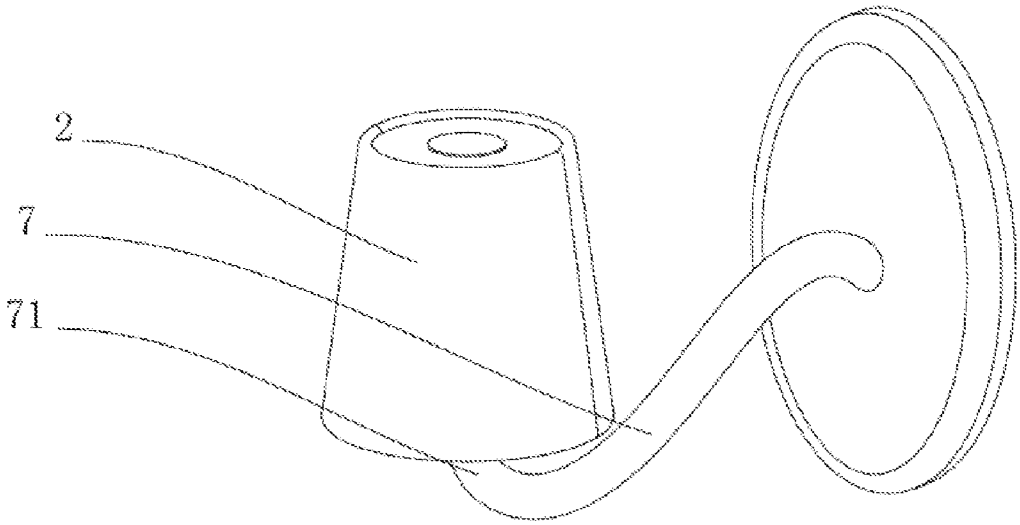
FIG. 7 is a schematic diagram of the multi-purpose lighting device as a wall light according to the present disclosure.
Figure 8:
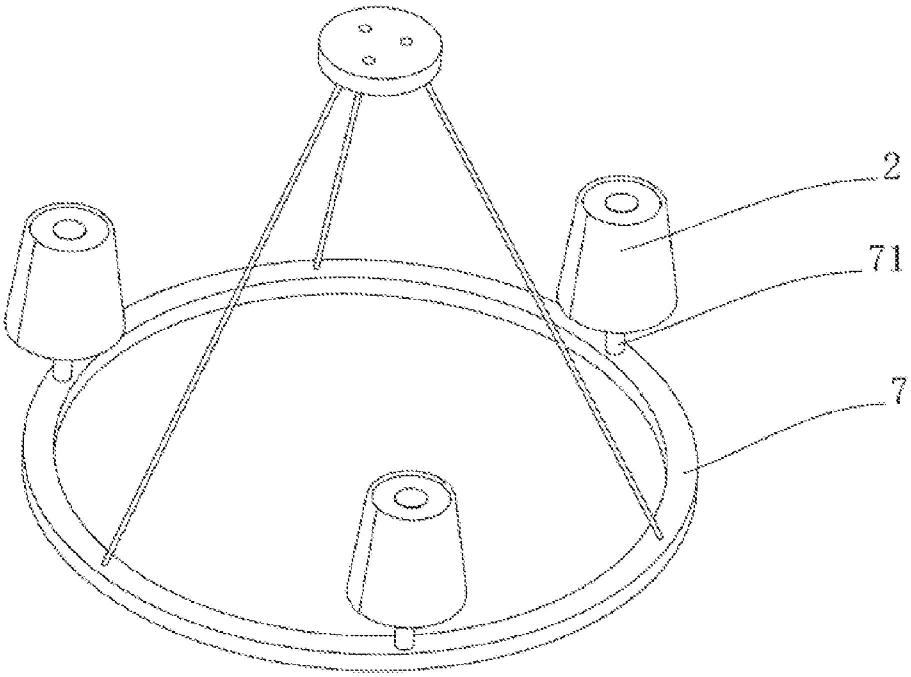
FIG. 8 is a schematic diagram of the multi-purpose lighting device as a pendant light according to the present disclosure.

Referring to FIGS. 1 to 8, a multi-purpose lighting device includes a bracket 1, a lampshade 2 provided on the bracket 1, a lamp cover 3 provided on a top of the bracket 1, and a lamp holder 4 provided on a bottom of the bracket 1. A light emitting part 5 is provided on the bracket 1 and located in the lampshade 2, as well as a power module 6 connected to the light emitting part 5 to provide power for the light emitting part 5; a clamp slot 41 with a downward opening is provided at a bottom of the lamp holder 4. This can be achieved by placing the lighting device on a horizontal surface for lighting, or by hanging it on a support part 7 of several types of lamp brackets through the clamp slot 41, to serve as different types of lighting fixtures for lighting. The support part 7 includes a connection part 71 that is protruded upwardly and can be inserted into the clamp slot 41.

In an implementation mode, the support part 7 is a table light support rod, and the connection part 71 is an upward end of the table light support rod, so the lighting device is suitable for use as a table light, such as at the head of the bed, table, etc.

In an implementation mode, the support part 7 is a floor light rod, and the connection part 71 is an upward end of the floor light rod, so that the lighting device can be used as a floor light, suitable for providing lighting in larger spaces such as living rooms or offices.

In an implementation mode, the support part 7 is a wall light suspension bracket, and the connection part 71 is an upward end of the wall light suspension bracket, so that the lighting device can be used as a wall light, suitable for corridors, bedroom walls, and other places.

In an implementation mode, the support part 7 is a pendant light hanger, and the connection part 71 is an upward end of the pendant light hanger, so that the lighting device can be used as a pendant light, suitable for the lighting needs of high ceiling places such as restaurants and conference rooms.

The advantage of the present disclosure lies in its flexibility and multifunctionality. A user can easily hang the lighting device on different types of lamp brackets according to the actual needs, and it is used as different types of lighting fixtures. It only needs to be hung on the support part 7 of the lamp bracket through its clamp slot, which not only simplifies the connection structure, but also greatly improves the product's applicability and user experience. It should be noted that for the convenience of disassembly and assembly, this lighting device is only suitable for use on lamp brackets with upward connection part 71. In an implementation mode, a cooperation between the clamp slot and the connection part 71 is an interference fit, and of course, a gasket can also be provided to fill a gap between the two.

In this embodiment, the bracket 1 includes an upper support frame 11, a lower support frame 12, and a connection rod 13 that connects the upper support frame 11 and the lower support frame 12. The light emitting part 5 is provided on the upper support frame 11, the lamp holder 4 is provided on the lower support frame 12, and the lampshade 2 is detachably connected to the upper support frame 11 and the lower support frame 12. The upper support frame 11 and the lower support frame 12 have a certain elasticity, which facilitates the assembly of the lampshade 2 on the bracket 1. The lampshade 2 is supported by the bracket 1, so that it can be placed on a horizontal plane and is not easily damaged.

In this embodiment, the lamp holder 4 includes a base fixing member 42 provided above the lower support frame 12, and a bottom plate 43 provided below the lower support frame 12. The base fixing member 42 is provided on an upper side of the lower support frame 12, and the bottom plate 43 is provided on a lower side of the lower support frame 12. There is a through hole between the two and they are fixed by screws, so that they can be detachably connected. Of course, the two can also be detachably connected by buckle components that cooperate with each other. The clamp slot 41 is provided on a bottom side of the base fixing member 42, and both the bottom plate 43 and the lower support frame 12 are provided with openings that communicate with the clamp slot 41.

In this embodiment, a top of the lampshade 2 is provided with a first elastic buckle 21 that can be fastened to an outer side of the upper support frame 11, and a support ring 44 is provided below the bottom plate 43; a diameter of the support ring 44 is the same as that of a bottom end of the bottom plate 43. A bottom of the lampshade 2 is provided with a second elastic buckle 22 that can be fastened to an outer side of the support ring 44. The outer side of the upper support frame 11 is circular, and the lampshade 2 is made of flexible material, thus, it has a certain degree of elasticity. The first elastic buckle 21 and the second elastic buckle can be inner flanges on two sides of the lampshade 2, which are arc-shaped so as to hook the upper support frame 11 and the outer side of the support ring 44.

In this embodiment, the power module 6 includes a battery housing 61 provided on the base fixing member 42, a battery 62 provided on the base fixing member 42 and located in the battery housing 61, and a USB charging port 63 for charging through the battery 62. The USB charging port 63 can be provided on external components such as the lamp holder 4, the lampshade 2, or the lamp cover 3, to charge the battery 62 when is inserted in a charging cable. The lamp cover 3 is fixed by covering on the battery housing 61 and can be made of heat dissipating material for heat dissipation.

In this embodiment, an upper end of the base fixing member 42 is sleeved with a magnetic ring 8, and at the same time, an iron sheet or a magnetic ring 8 is adhered or embedded on a end of the connection part 71, thus, it has magnetic. By attracting the magnetic ring 8, the two can be firmly connected together.

In this embodiment, the light emitting part 5 includes a light strip 51 provided on a lower side of an upper support platform of the upper support frame 11, and a plurality of light beads 52 uniformly distributed on the light strip 51 for lighting. Of course, a wireless control module can also be provided on the upper support frame 11 that is connected with Bluetooth or Wi-Fi, so as to remotely control the light emitting part 5 for the user to use.

Taking the ideal embodiment of the present disclosure as inspiration, those skilled in the art can make various changes and modifications within the scope of the technical idea of the present disclosure without departing from the above description. The technical scope of the present disclosure is not limited by the specification and determined by the scope of the claims.

What is claimed is:

1. A multi-purpose lighting device, comprising a bracket, a lampshade provided on the bracket, a lamp cover provided on a top of the bracket, and a lamp holder provided at a bottom of the bracket, wherein a light emitting part and a power module connected to the light emitting part are provided on the bracket and located in the lampshade, a clamp slot with a downward opening is provided at a bottom of the lamp holder;

the lighting device is capable of being placed on a horizontal surface for lighting use, or hung on a support part of several types of lamp brackets through the clamp slot for lighting use;

the support part comprises a connection part that protrudes upward and is capable of being inserted into the clamp slot;

wherein the bracket comprises an upper support frame, a lower support frame, and a connection rod connecting the upper support frame and the lower support frame, the light emitting part is provided on the upper support frame, the lamp holder is provided on the lower support frame, and the lampshade is detachably connected to both the upper support frame and the lower support frame.

2. The multi-purpose lighting device according to claim 1, wherein the support part is a table light support rod, and the connection part is an upward protruding end of the table light support rod, so that the lighting device serves as a table light.

3. The multi-purpose lighting device according to claim 1, wherein the support part is a floor light rod, and the connection part is an upward protruding end of the floor light rod, so that the lighting device serves as a floor light.

4. The multi-purpose lighting device according to claim 1, wherein the support part is a wall light suspension bracket, and the connection part is an upward protruding end of the wall light suspension bracket, so that the lighting device serves as a wall light.

5. The multi-purpose lighting device according to claim 1, wherein the support part is a pendant light hanger, and the connection part is an upward protruding end of the pendant light hanger, so that the lighting device serves as a pendant light.

6. The multi-purpose lighting device according to claim 1, wherein the lamp holder comprises a base fixing member provided above the lower support frame, and a bottom plate provided below the lower support frame, wherein the clamp slot is provided on the base fixing member.

7. The multi-purpose lighting device according to claim 1, wherein a top of the lampshade is provided with a first elastic buckle that is fastened to an outside of the upper support frame, a support ring is provided below the bottom plate, and a bottom of the lampshade is provided with a second elastic buckle that is fastened to an outside of the support ring.

8. The multi-purpose lighting device according to claim 6, wherein the power module comprises a battery housing provided on the base fixing member, a battery provided on the base fixing member and located in the battery housing, and a USB charging port that charges the battery; the lamp cover covers above the battery housing.

9. The multi-purpose lighting device according to claim 1, wherein an upper end of the base fixing member is sleeved with a magnetic ring.

10. The multi-purpose lighting device according to claim 1, wherein the light emitting part comprises a light strip provided on the upper support frame, and a plurality of light beads provided on the light strip.

* * * * *